United States Patent
Park et al.

(10) Patent No.: US 7,922,233 B2
(45) Date of Patent: Apr. 12, 2011

(54) SLIDING ROOF FOR CONVERTIBLE VEHICLE

(75) Inventors: Tae Wan Park, Seoul (KR); Chang Wook Park, Suwon-si (KR); Seung Jin Heo, Seoul (KR); Jay Il Jeong, Seoul (KR); Il Hwan Kim, Seoul (KR); Jong Hoon Lee, Seoul (KR); In Sik Hwang, Seoul (KR)

(73) Assignees: Hyundai Motor Company, Seoul (KR); Kookmin University Industry-Academy Cooperation Foundation, Seoul (KR)

( * ) Notice: Subject to any disclaimer, the term of this patent is extended or adjusted under 35 U.S.C. 154(b) by 21 days.

(21) Appl. No.: 12/623,150

(22) Filed: Nov. 20, 2009

(65) Prior Publication Data

US 2011/0049929 A1 Mar. 3, 2011

(30) Foreign Application Priority Data

Aug. 27, 2009 (KR) ........................ 10-2009-0080019

(51) Int. Cl.
*B60J 7/14* (2006.01)
*B60J 7/047* (2006.01)
(52) U.S. Cl. .............. 296/108; 296/107.17; 296/107.18; 296/107.2
(58) Field of Classification Search .................. 296/108, 296/107.16–107.2
See application file for complete search history.

(56) References Cited

U.S. PATENT DOCUMENTS

| | | | | |
|---|---|---|---|---|
| 6,648,397 | B2* | 11/2003 | Schutt et al. | 296/107.16 |
| 6,688,670 | B2 | 2/2004 | Biecker et al. | |
| 6,957,843 | B2* | 10/2005 | Guillez | 296/107.2 |
| 7,780,217 | B2* | 8/2010 | Halbweiss | 296/107.09 |
| 2002/0030381 | A1* | 3/2002 | Schutt et al. | 296/108 |
| 2004/0113453 | A1* | 6/2004 | Guillez et al. | 296/107.2 |
| 2005/0218691 | A1* | 10/2005 | Obendiek | 296/108 |

FOREIGN PATENT DOCUMENTS

| | | |
|---|---|---|
| JP | 2003-159946 A | 6/2003 |
| JP | 2005-528269 A | 9/2005 |
| JP | 2005-529015 A | 9/2005 |

* cited by examiner

*Primary Examiner* — Dennis H Pedder
(74) *Attorney, Agent, or Firm* — Morgan, Lewis & Bockius LLP

(57) ABSTRACT

A sliding roof for a convertible vehicle may include front, middle, and rear roofs, guide rails for sliding the front, middle, and rear roofs, and lift links for lifting the front and rear roofs such that the guide rail of the middle roof slides toward the guide rail of the rear roof and packaged adjacent to the rear of the vehicle. The sliding roof may include a latch which fixes a side pillar of the front roof to a windshield frame during operation of a sunroof and fixes the side pillar to the sunroof during packaging of the roof, thus ensuring the space of a rear seat of the vehicle.

3 Claims, 7 Drawing Sheets

SLIDING ROOF FOR CONVERTIBLE VEHICLE

CROSS-REFERENCE TO RELATED APPLICATION

The present application claims priority of Korean Patent Application Number 10-2009-0080019 filed Aug. 27, 2009, the entire contents of which application is incorporated herein for all purposes by this reference.

BACKGROUND OF THE INVENTION

1. Field of the Invention

The present disclosure relates to a sliding roof for a convertible vehicle. More particularly, it relates to a sliding roof, in which roof panels for a convertible vehicle are packaged in a sliding manner and stored in a trunk.

2. Description of Related Art

In general, a convertible vehicle is provided with a movable roof capable of being opened and closed with respect to a vehicle body. When the vehicle roof is opened, the roof is stored in a trunk in a folding or sliding manner to be used as an open car, and the opened roof can be closed over the vehicle body, if necessary.

FIG. 1 is a partial perspective view of a conventional convertible vehicle.

As shown in FIG. 1, the conventional convertible vehicle includes a front roof 10 being in contact with a windshield frame, a middle roof 20 disposed to be separated from the rear of the front roof 10, and a rear roof 30 disposed to be separated from the rear of the middle roof 20.

Such roof panels are stacked in a folding or sliding manner by a plurality of link means and an actuator and selectively accommodated in the rear of the vehicle, and a main mechanism 40 for the accommodation is provided.

A roof connecting device for connecting the front and rear ends of each of the front, middle, and rear roofs 10, 20, and 30 is provided. Moreover, the front roof 10 may be divided into a sunroof 11 and a side pillar 13 disposed on each of both sides of the sunroof 11.

The roof for the conventional convertible vehicle having the above-described configuration is opened in the following manner. First, the sunroof 11 of the front roof 10 slides on the middle roof 20, the rear roof 30 moves on the middle roof 20 and the sunroof 11 in a folding manner to form a roof package intermediate L, and the roof package intermediate L is entered into the vehicle trunk by the main mechanism 40.

However, the roof for the conventional convertible vehicle has the problem that, since the rear roof 30 moves on the middle roof 20 and the sunroof 11 in a folding manner, it occupies a larger trunk space than a sliding roof (refer to FIG. 5).

Moreover, since the roof package intermediate L is formed in the position of the middle roof 20, the link length of the main mechanism 40 is somewhat increased and, therefore, the main mechanism 40 needs a driving device capable of outputting high power, thus reducing the volume of the vehicle trunk (refer to FIG. 4).

Since only the sunroof 11 slides when the roof panels of the conventional convertible vehicle are packaged, the side pillars 13 of the front roof 10 protrude toward a rear seat of the vehicle, thus reducing the rear space of the vehicle. Furthermore, an additional driving device for opening the side pillars of the front roof 10 to both sides is required to ensure the space of the rear seat.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

The present invention has been made in an effort to solve the above-described problems associated with prior art. Accordingly, the present invention provides a sliding roof for a convertible vehicle including front, middle, and rear roofs, guide rails for sliding the front, middle, and rear roofs, and lift links for lifting the front and rear roofs such that the guide rail of the middle roof slides toward the guide rail of the rear roof and packaged adjacent to the rear of the vehicle.

Moreover, the present invention provides a sliding roof for a convertible vehicle including a latch which fixes a side pillar of the front roof to a windshield frame during operation of a sunroof and fixes the side pillar to the sunroof during packaging of the roof, thus ensuring the space of a rear seat of the vehicle.

In one aspect, the present invention provides a sliding roof for a convertible vehicle, the sliding roof including: a front roof disposed at a windshield frame; a rear roof disposed at a trunk; a middle roof disposed between the front roof and the rear roof; a rear rail disposed at the bottom of the rear roof; a middle rail disposed at the bottom of the middle roof and slid along the rear roof; a front rail disposed at the bottom of the front roof and slid along the middle rail; a sub-front lift link for connecting the front roof to the front rail and lifting the front roof; and a sub-rear lift link for connecting the rear roof to the rear rail and lifting the rear roof.

Other aspects and other embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
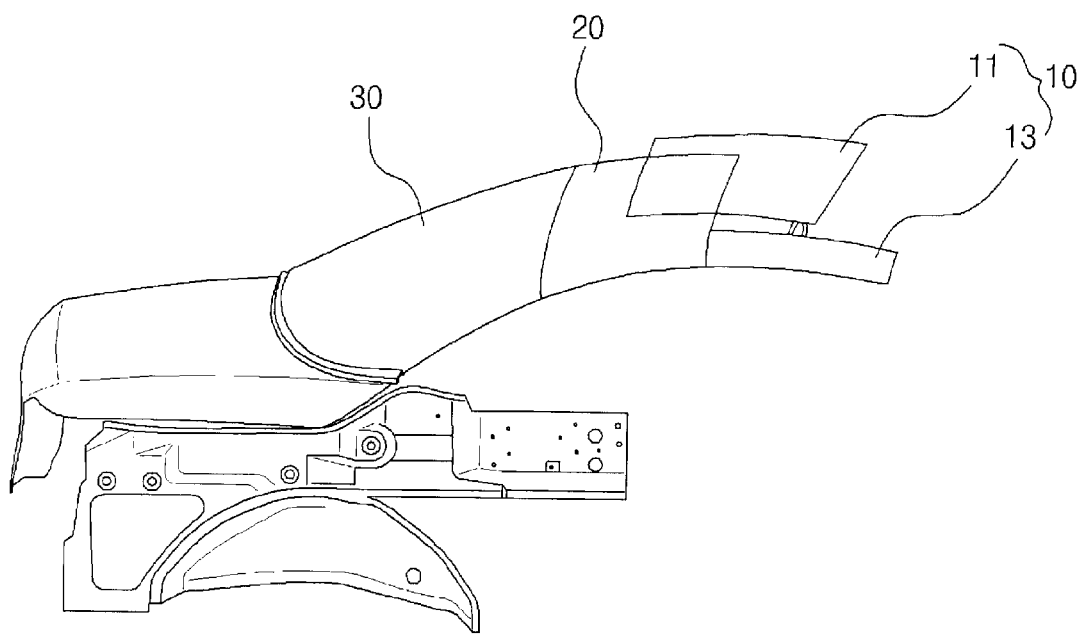
FIG. 1 is a partial perspective view of a conventional convertible vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

The present invention provides a sliding roof for a convertible vehicle which is operated in a sliding manner. The sliding roof includes guide rails 115, 125, and 135 for sliding roof panels 110, 120, and 130, and lift links 117 and 137 for lifting the roof panels 110 and 130 such that the front roof 110 sliding on the middle roof 120 slides toward the rear roof 130 together with the middle roof 120 and are stored in a trunk at a lower height than the conventional one, thus increasing the trunk volume and, at the same time, reducing the time required to open and close the sliding roof compared to the conventional folding roof.

Figure 2:
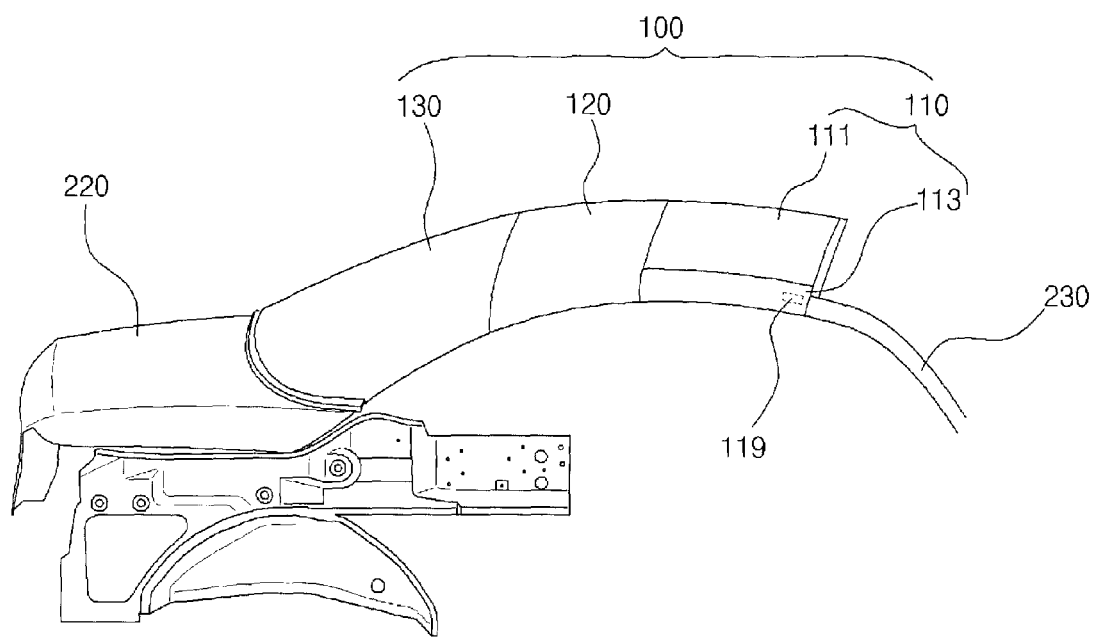
FIG. 2 is a partial perspective view of a sliding roof for a convertible vehicle in accordance with various embodiments of the present invention.
Figure 3A:
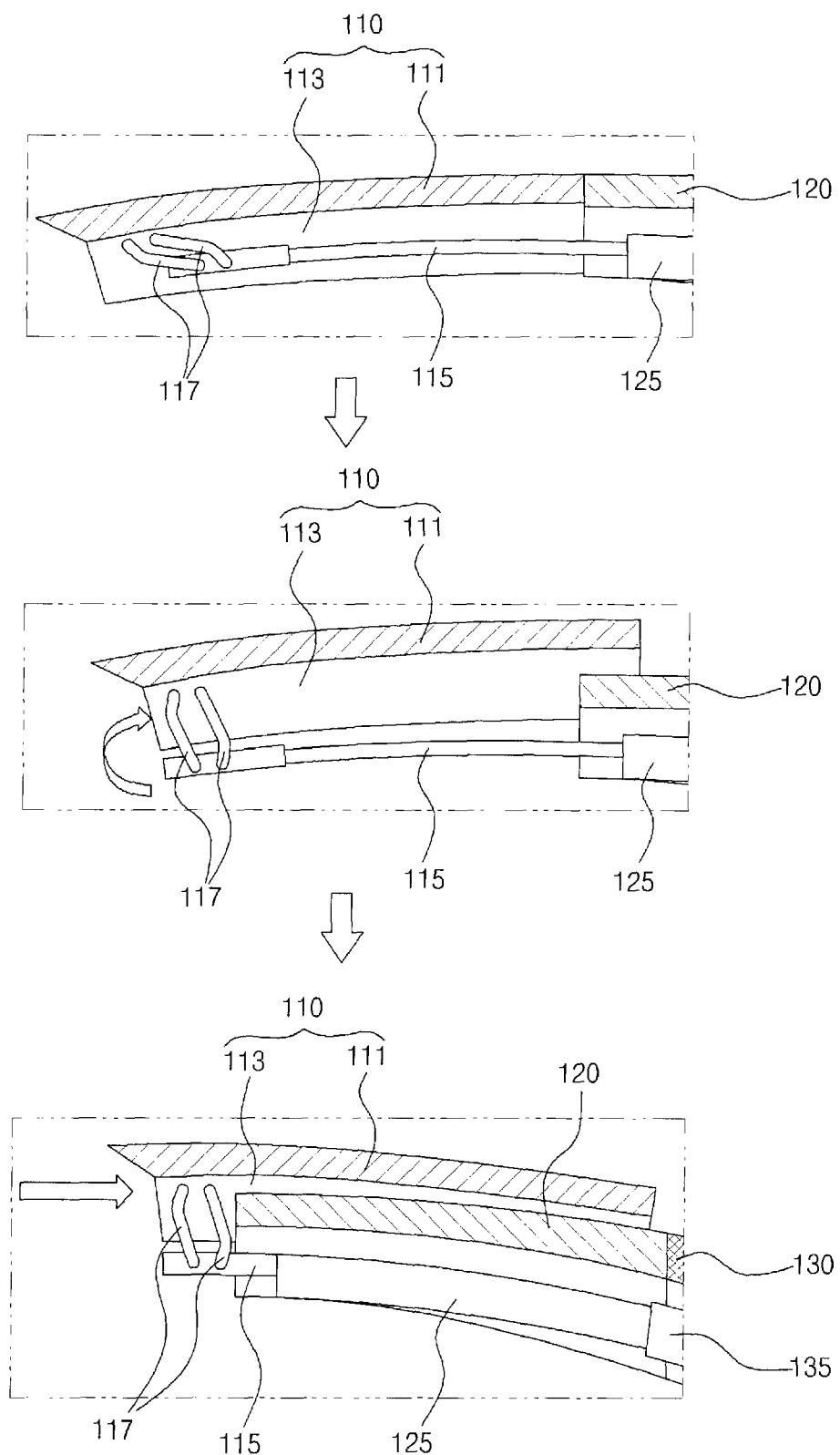
FIGS. 3A to 3C are flowcharts illustrating the operational processes in accordance with various embodiments of the present invention.
Figure 3B:
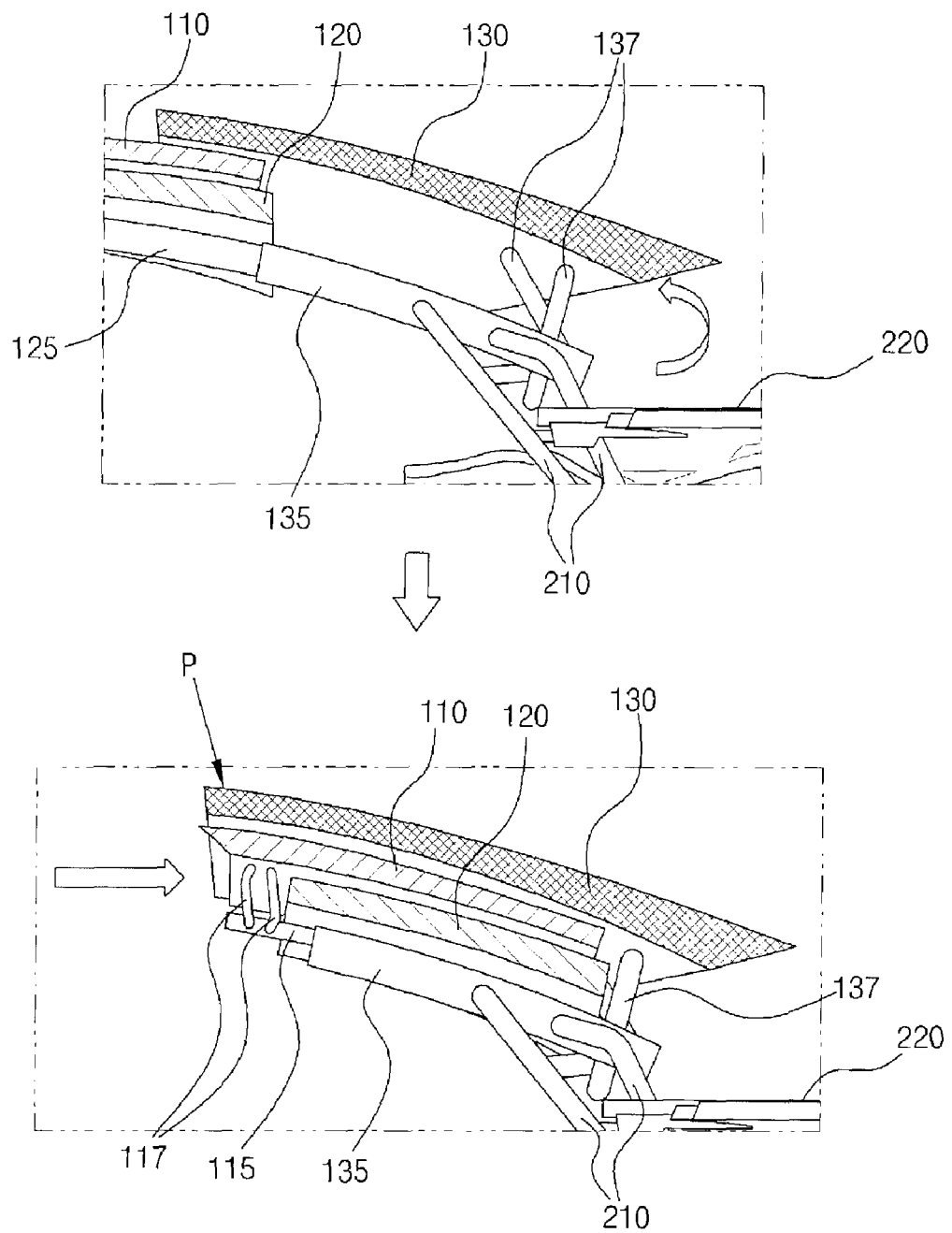
Figure 3C:
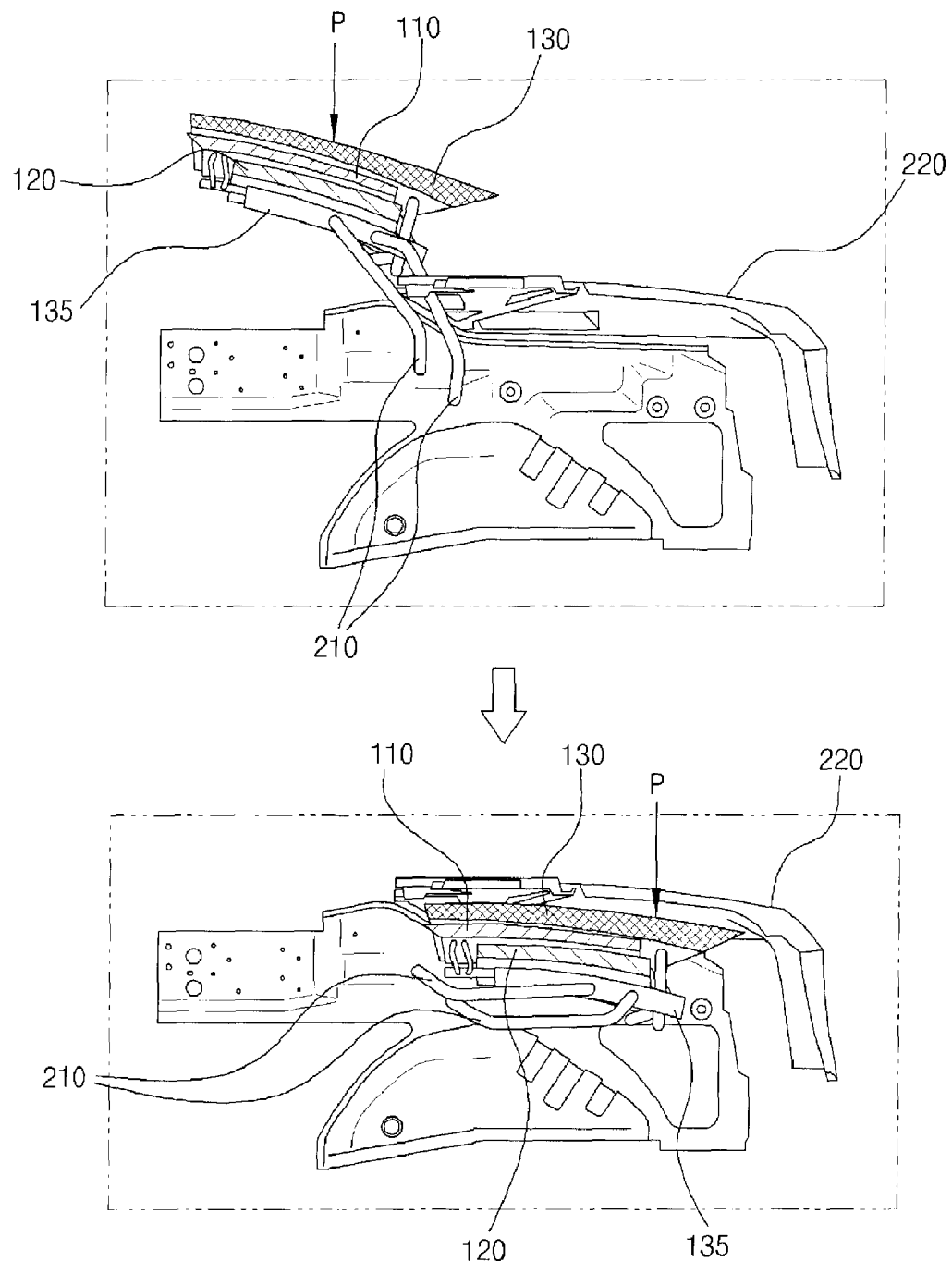
Figure 4:
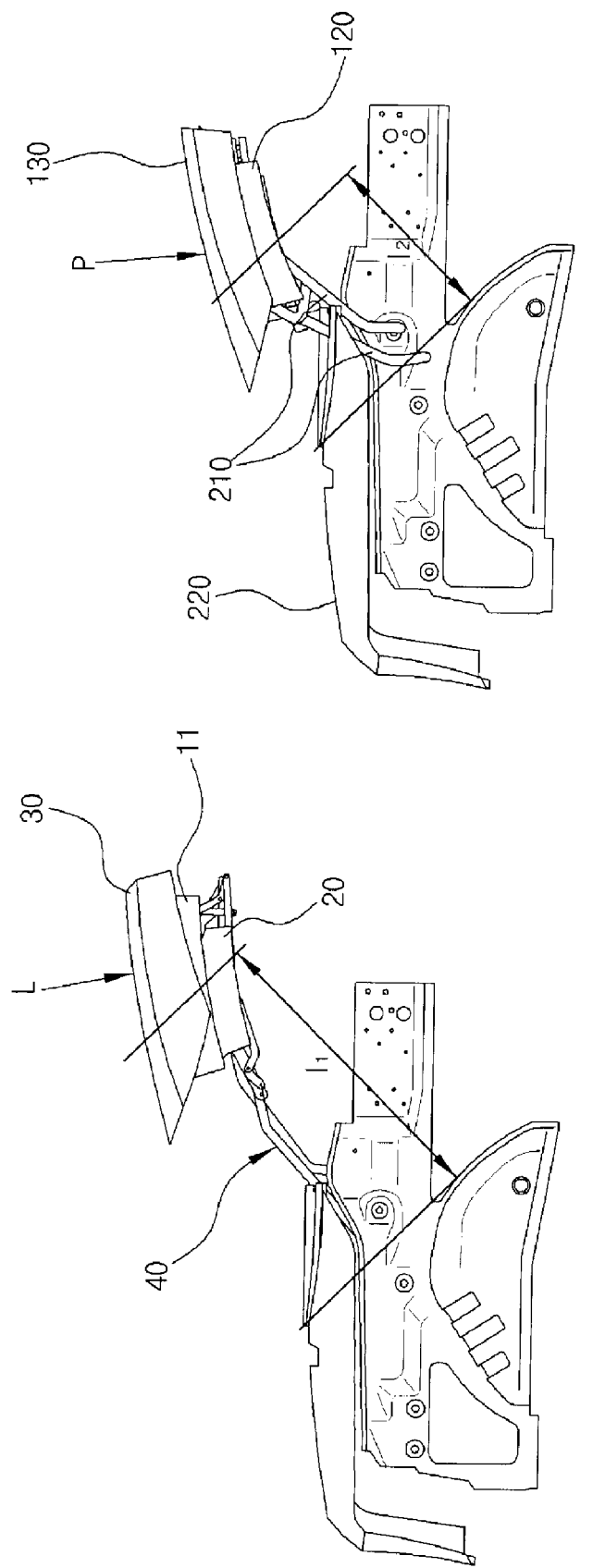
FIG. 4 is a diagram comparing the link length of a main mechanism in accordance with various embodiments of the present invention with that of the prior art.
Figure 5:
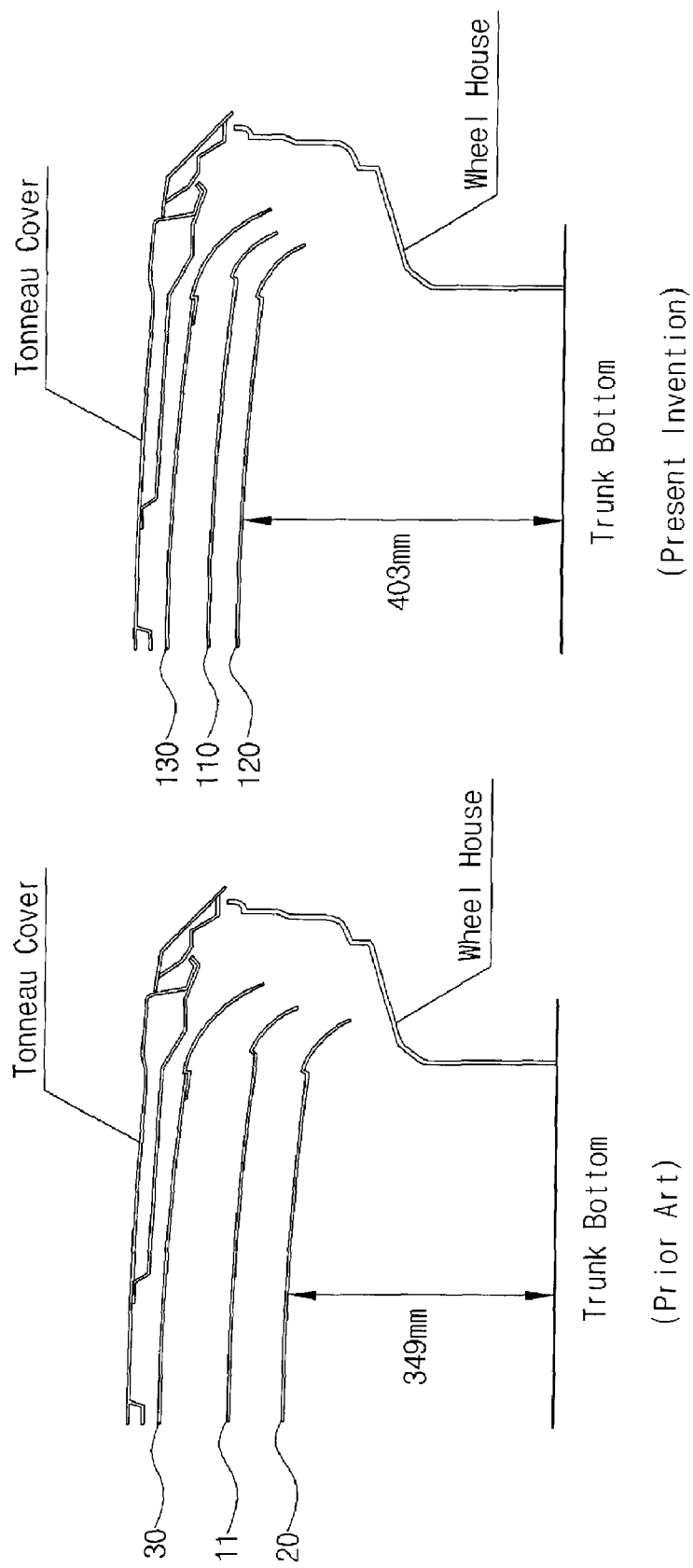
FIG. 5 is a diagram comparing the volume of a trunk in accordance with various embodiments of the present invention with that of the prior art.

FIG. 2 is a partial perspective view of a sliding roof for a convertible vehicle in accordance with various embodiments of the present invention, FIGS. 3A to 3C are flowcharts illustrating the operational processes in accordance with various embodiments of the present invention, FIG. 4 is a diagram comparing the link length of a main mechanism in accordance with various embodiments of the present invention with that of a prior art, and FIG. 5 is a diagram comparing the volume of a trunk in accordance with various embodiments of the present invention with that of a prior art.

As shown in FIG. 2, the sliding roof may include a front roof 110 disposed at a windshield frame 230 for fixing a front window of the vehicle, a middle roof 120 disposed at the rear of the front roof 110, and a rear roof 130 disposed in front of a vehicle trunk.

In the sliding roof in accordance with the present invention, the front roof 110 slides on the middle roof 120 and the middle roof 120 on which the front roof 110 is put slides down the rear roof 130, thus forming a roof package intermediate P as shown in FIG. 3C.

For this purpose, the front, middle, and rear rails 115, 125, and 135 are disposed at the bottom of each of the roof panels 100 (i.e., front, middle, and rear roofs 110, 120, and 130), a sub-front lift link 117 and a sub-rear lift link 137 for connection with the guide rails 115 and 135 and for lifting the roof panels 110 and 130 are provided, and the middle rail 125 is mounted at the bottom of the middle roof 120 such that the middle roof 120 moves together with the middle rail 125 when the middle rail 125 slides.

In the present invention, the sub-front lift link 117 may be mounted at the front end of the front rail 115 (i.e., at the windshield frame 230) such that the front rail 115 can slide along the middle rail 125 as shown in FIG. 3A.

Otherwise, a hooking means such as a hook may be formed at the front end of the front rail 115 such that the front end of the front rail 115 does not slide along the middle rail 125.

The guide rails have a mechanism in which the front rail 115 slides along the middle rail 125 and the middle rail 125 slide along the rear rail 135, and the respective roof panels 100 also slide together with the sliding movement of the guide rails.

At this time, the lift links such as the sub-front lift link 117 and the sub-rear lift link 137 lift the front roof 110 and the rear roof 130 from the guide rails 115 and 135 such that the front roof 110 slides on the middle roof 120 and the middle roof 120 slides below the rear roof 130.

In various embodiments of the present invention, the lift links 117 and 137 may be configured with a four-bar link operated by an actuator.

Accordingly, a main mechanism 210 is connected to the roof package P in which the respective roof panels 100 are configured to slide, and the roof package P is moved into the trunk by the operation of the main mechanism 210.

According to the present invention which employs the sliding movement, it is possible to reduce the time required to open and close the sliding roof compared to the conventional folding movement and increase the volume of the trunk (by about 54 mm) with the use of the roof package P having a height lower than that of the conventional one as shown in FIG. 5.

Moreover, since the front roof 110 and the middle roof 120 slide toward the rear roof 130 which is most adjacent to the trunk, the roof package P is located at the rear of the vehicle compared to the conventional one, and thus the link length $l_2$ of the main mechanism 210 including a driving device (not shown) provided in the trunk is further reduced (in FIG. 1, $l_1$ is 552 mm and $l_2$ is 428 mm). As a result, since it is possible to apply a driving device (e.g., a motor) which outputs relatively low power to the main mechanism 210, the driving device can be downsized, and thus the volume of the trunk can be increased.

Meanwhile, the front roof 110 in accordance with the present invention may be divided into a sunroof 111 and a side pillar 113 disposed on each of both sides of the sunroof 111, and a latch 119, which is fixed to either the windshield frame 230 or the sunroof 111 to selectively lock and unlock the windshield frame 230 and the sunroof 111, may be provided at the front end of each of the side pillars 113.

When only the sunroof 111 slides, the latch 119 selectively locks the windshield frame 230 to fix the side pillar 113 to the windshield frame 230 and, when the sunroof 111 and the side pillars 113 simultaneously slide to open the sliding roof (i.e., to form the roof package P), the latch 119 unlocks the windshield frame 230 and locks the sunroof 111 such that the side pillars 113 slide on the middle roof 120 together with the sunroof 111.

The sub-front lift link 117 mounted at the front end of the front rail 115 may be mounted at the bottom of the sunroof 111 such that the sunroof 111 can be independently slid.

For example, the latch 119 may have a hook shape to fix the windshield frame 230 or the sunroof 111 with a hooking structure.

Therefore, according to the sliding roof in accordance with the present invention, it is possible to open and close the roof itself and provide the function of the sunroof 111.

Moreover, since the side pillars 113 as well as the sunroof 111 are slid and stored in the trunk, it is possible to ensure the space of a rear seat of the vehicle.

Next, the operation state of the sliding roof in accordance with various embodiments of the present invention will be described.

As shown in FIGS. 3A to 3C, when the sliding roof of the present invention is opened, the front roof 110 is lifted from the front rail 115 to a predetermined height by the sub-front lift link 117, the front rail 115 slides along the middle rail 125, and thus the front roof 110 is located at the top of the middle roof 120.

Then, the rear roof 130 is lifted from the rear rail 135 to a predetermined height by the sub-rear lift link 137, the middle rail 125 slides along the rear rail 135, and thus the front roof 110 and the middle roof 120 are located at the bottom of the rear roof 130.

The roof package P formed by sliding the respective roof panels 100 in the above-described manner is moved and stored in the trunk by the main mechanism 210 after a trunk cover 220 is opened.

As described above, the sliding roof for the convertible vehicle of the present invention provides the following effects:

(1) Since the roof panels including the front, middle, and rear roofs are stacked in a sliding manner, the roof panels can be stored in the trunk at a lower height than the conventional one, and thus it is possible to increase the volume of the trunk and reduce the time required to open and close the sliding roof;

(2) Since the roof package intermediate formed by packaging the roof panels is located in the position of the rear roof which is most adjacent to the rear of the vehicle, the link length between the main mechanism and the roof package intermediate is reduced, and thus it is possible to apply a downsized driving device which outputs relatively low power to the main mechanism, thereby increasing the volume of the trunk;

(3) Since the side pillar of the front roof can be fixed to the sunroof by the latch, it is possible to ensure the space of the rear seat of the vehicle when the roof panels are packaged; and (4) It is possible to simplify the structure of the sliding roof with the use of the sliding guide rails having a simplified structure.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sliding roof for a convertible vehicle, the sliding roof comprising:
   a front roof disposed adjacent a windshield frame;
   a rear roof disposed adjacent a trunk;
   a middle roof disposed between the front roof and the rear roof;
   a rear rail disposed at the bottom of the rear roof;
   a middle rail disposed at the bottom of the middle roof and slid along the rear roof;
   a front rail disposed at the bottom of the front roof and slid along the middle rail;
   a sub-front lift link for connecting the front roof to the front rail and lifting the front roof; and
   a sub-rear lift link for connecting the rear roof to the rear rail and lifting the rear roof.

2. The sliding roof of claim 1, wherein the front roof comprises a sunroof to which the sub-front lift link is connected and a side pillar disposed on a side of the sunroof, and the side pillar comprises a latch to selectively lock the windshield frame and the sunroof.

3. The sliding roof of claim 1, wherein the sub-front lift link is disposed at a front end at the windshield frame of the front rail.

* * * * *